B. D. HORTON.
HOLE CLOSURE.
APPLICATION FILED APR. 13, 1915.
1,345,489.
Patented July 6, 1920.
2 SHEETS—SHEET 1.
FIG. 2
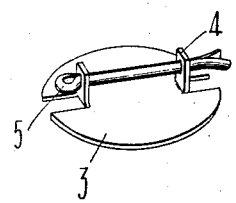
FIG. 3
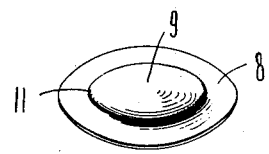
FIG. 4
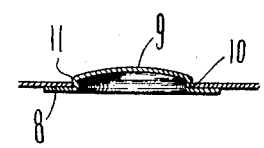
FIG. 5
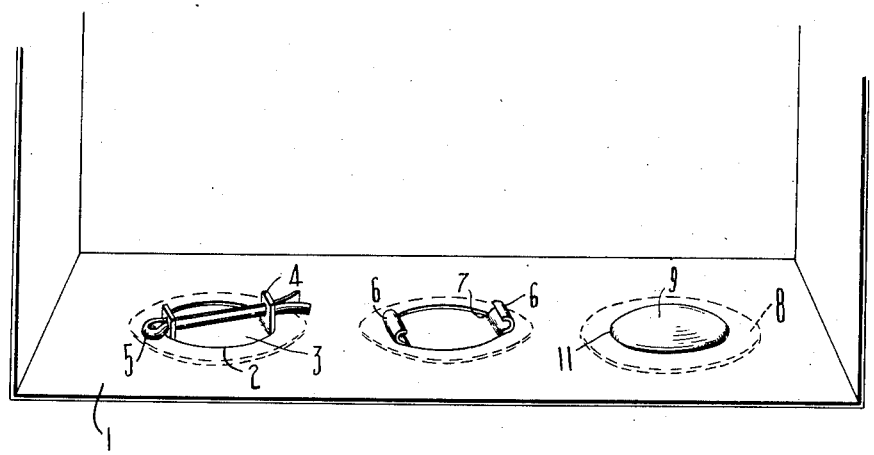
FIG. 1
WITNESSES:
INVENTOR.
Bryson D. Horton
BY
ATTORNEY

B. D. HORTON.
HOLE CLOSURE.
APPLICATION FILED APR. 13, 1915.

1,345,489.

Patented July 6, 1920.
2 SHEETS—SHEET 2.

WITNESSES:

INVENTOR.
BY
ATTORNEY

UNITED STATES PATENT OFFICE.

BRYSON DEXTER HORTON, OF DETROIT, MICHIGAN.

HOLE-CLOSURE.

1,345,489.      Specification of Letters Patent.      Patented July 6, 1920.

Application filed April 13, 1915. Serial No. 20,983.

*To all whom it may concern:*

Be it known that I, BRYSON DEXTER HORTON, a citizen of the United States, residing at Detroit, in the county of Wayne and State of Michigan, have invented certain new and useful Improvements in Hole-Closures, of which the following, taken in connection with the accompanying sheet of drawings, is a full, clear, and concise description thereof and such as will enable others skilled in the art to make and use the same.

My invention more particularly relates to seals capable of repeated use for closing knock-out apertures in switch casings which find useful employment when a conduit has been removed from the casing and it is desired to close the aperture through which the same had projected.

Referring to the accompanying drawings in which—

Figure 1 illustrates a fragmentary detail of the electrical switch box or housing showing the application of my invention thereto.

Fig. 2 is a perspective view of one form in which my invention may find embodiment.

Fig. 3 is a similar view of a different form in which my invention may find embodiment.

Figs. 4 and 5 are perspective and cross-sectional views of a still further embodiment thereof, the latter view showing the same applied to the switch casing.

Figs. 6, 8, 10, 12, 14, 16 and 18 are perspective views of still further modifications of my invention, while

Figure 6:
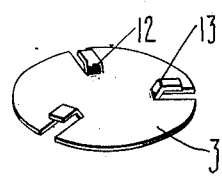

It is common practice to indent, score or weaken sides of switch casings for the purpose of rendering the weakened part susceptible of being readily removed in order to provide for the insertion of wires or conduits conveying the same to the interior of the casing for switch wiring purposes.

Frequently a conduit is removed from the switch casing, due to an alteration or change in the wiring, and when so removed, the aperture presents an opening through which moisture and dust, and even rain (should the switch be so positioned or exposed) may enter and corrode the metallic conductor parts, short circuit, or otherwise interfere with the circuits or operation of the mechanical parts. It is the object of my invention to provide a convenient seal for closing such an aperture in an expeditious and inexpensive way.

Referring to the Figs. 1 and 2 of the drawings in detail, 1 indicates a side of a metallic switch casing, which is scored or indented at 2, at which point the weakened part, commonly referred to as "knock-out," has been removed, leaving the aperture or opening therein. The seal may take the form of a disk made of sheet metal as indicated at 3 and provided with two rearwardly-extending ear pieces 4, which are adapted to project within the opening into the interior of the housing. The disk is of larger diameter than the aperture so that a flange is provided which abuts against the exterior side of the casing. The rearwardly-extending ears 4 are apertured, and through these apertures I insert a cotter pin, or other suitable bar, both extremities of which extend beyond the edge of the aperture so as to overlap and contact with the interior surface of the side of the casing, thus locking the seal and holding it in position, and covering the aperture from which the knock-out had been previously removed.

I may, if desired, form the seal of springy metal in which case the rearwardly-extending ears will be formed, as shown at Fig. 3. In this form the extremities of the ears are curved outwardly toward the edge of the disk forming a rounded portion 6 which, when brought into contact with the edge of the aperture, will give inwardly or toward each other so that they may be forced within the housing. As soon as they are forced beyond the inner peripheral edge of the aperture they will, by reason of their inherent springy nature, spring outwardly or away from each other, and thus automatically position themselves with the edge of the casing seated within the seats 7. In this manner the aperture is effectively closed by a seal of one-piece construction.

I may, instead of forming the seal in the manner heretofore described in connection with Figs. 2 and 3, eliminate entirely the rearwardly-extending ear pieces and form the same cup shaped as shown in Figs. 4 and 5. In this embodiment the seal is made of spring material with a flange portion 8 and a central depressed cup portion 9, having a circumferential groove or seat portion 10 and a circumferential rounded edge portion 11, the latter being a trifle larger in diameter than the aperture of the casing. In applying this form of seal, pressure is exerted on the center of the cup portion 9 so that, as the seal is being forced through the aperture, it slightly contracts to permit the edge 11 to pass the edge of the aperture so that the latter will enter its seat 10, as is thought to be well understood from the drawing.

Figure 7:
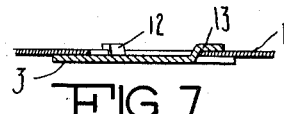

In Figs. 6 and 7 I have illustrated a very simple one-piece metal seal in which the closing plate or disk 3 is provided with a series of rearwardly-extending fingers or ears 12 stamped from the body of the metal. In applying this seal to the aperture of the casing the fingers 12 extend directly outwardly in parallel direction to permit them to be freely inserted through the aperture, whereupon they are bent over at 13 with the free ends extending in a plane common to the plane of the main body portion of the disk with the casing interposed therebetween, as is shown more clearly in Fig. 7.

Figure 8:
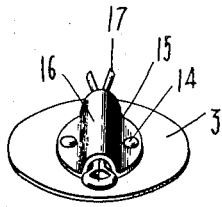
Figure 10:
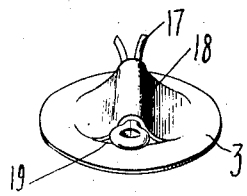
Figure 12:
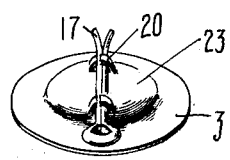
Figure 14:
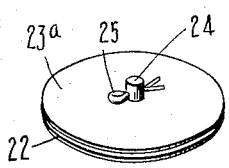
Figure 9:
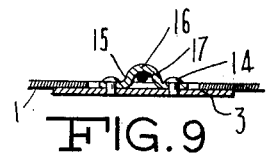
Figure 11:
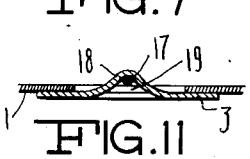
Figure 13:
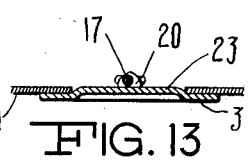

Referring to the modification shown in Figs. 8 and 9, however, I use a flat metal disk 3, and fastened thereto by a rivet or equivalent means 14 a plate provided with a semi-annular rearwardly-extending portion 16 forming an opening aperture through which a cotter pin 17 may be inserted for retaining the plate in assembled position on the switch casing. The ends of the cotter pin, of course, extend a sufficient distance beyond the edge of the aperture to lock the seal in place. I may embody my invention, however, in a somewhat like construction, but made from a single plate of metal, and such a construction I have shown in Figs. 10 and 11 in which the center of the disk 3 is pressed outwardly at 18, the metal being opened up at 19 forming a suitable channel or opening for the reception of the retaining cotter pin 17. I may, instead of bending or depressing the entire central zone of the metal disk outwardly in the manner just described, form the cotter pin retaining means by stamping a pair of lugs or fingers 20, as shown specifically in Figs. 12 and 13. In this form I preferably cup the center portion, as at 23, so as to more effectively seal the aperture in which it is located. Very simple embodiments of my invention may take the form of a two-part seal, such as is shown in Figs. 14 to 19 inclusive.

Figure 15:
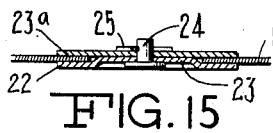
Figs. 7, 9, 11, 13, 15, 17 and 19 are cross-sectional views of the last-referred to constructions showing the same applied to and closing apertures of switch casings.
Figure 19:
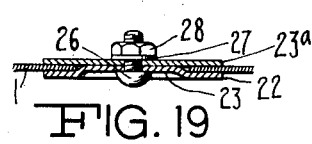

The seals shown in Figs. 14, 15, 18 and 19 consist of two metal disks (22 and 23ª) adapted to fit against the respective sides of the casing, as shown in Figs. 15 and 19, the center portion of the disk 22 being cupped inwardly at 23 so as to substantially fill the aperture in the casing. To hold the disks in place, I may use the headed stud, as shown at 24, through which a retaining cotter pin 25 extends to hold the parts in assembled relation, or I may use the threaded clamping bolt 26 shown in Fig. 19 adapted to receive a washer 27 and nut 28, the latter, when tightened, clamping the parts in their assembled position.

Figure 16:
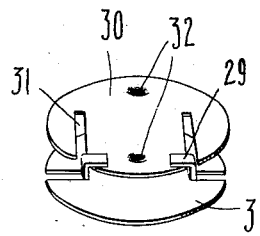
Figure 18:
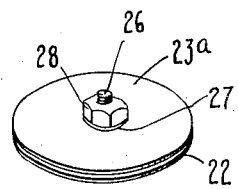
Figure 17:

In connection with the modification shown in Figs. 16 and 17 I form the disk 3 with a pair of diametrically-opposed inwardly-extending fingers 29, and the opposite clamping plate 30 with a pair of parallel slots 31, which are adapted to receive the retaining fingers 29 when the plate is slid into position with the wall of the casing interposed between the disks. In order to hold the parts in assembled relation I indent the plate 30 at 32. Theses indentations swage the metal outwardly forming projections 33 on the opposite side of the disk, and are so positioned with relation to the diameter of the aperture that they will project thereinto and engage the edge of the aperture and hold the parts firmly in their proper position.

I do not wish to be limited to the precise details in the constructions shown, as it is manifest that my invention may find embodiment in other specific structural ways.

Having thus described my invention, what I claim as new herein and desire to secure by Letters Patent is:—

1. The closure for an aperture in the wall of the switch casing, comprising a sheet metal disk having an upstruck portion adapted to pass through the aperture from one side thereof, and means for securing the disk in place, said means being entirely on the other side and adapted to engage with said portion and the other side of said wall.

2. In combination, a sheet metal disk for closing an aperture in the wall of a switch casing, said disk having an upstruck portion adapted to pass through the aperture from one side thereof, means for securing the disk in place, said means being entirely on the other side and adapted to engage with said portion and the other side of said wall, and means for engaging the edge of the aperture to keep the disk in place.

3. In combination, an apertured switch casing, a seal member for the aperture, said seal member having a supporting surface in contact with one surface of the casing about the periphery of the aperture, said member having a portion thereof extending through the aperture and means coöperating solely with said portion and with the other surface of the casing for releasably retaining the seal member in position to close the aperture.

4. A closure for an aperture in the wall of the switch casing comprising a sheet metal disk having an upstruck portion adapted to pass through the aperture from one side thereof, and means in engagement with said portion and adapted to engage the wall from the other side, said means comprising a cotter pin.

5. A closure for an aperture in the wall of the switch casing comprising a sheet metal disk having an upstruck portion adapted to pass through the aperture from one side thereof, and means in engagement with said portion and adapted to engage the wall from the other side, said means comprising a cotter pin, said upstruck portion being adapted to provide means for alining the closure and aperture.

In witness whereof I have hereunto set my hand.

BRYSON DEXTER HORTON.